US009460170B2

(12) United States Patent
Boensch et al.

(10) Patent No.: US 9,460,170 B2
(45) Date of Patent: Oct. 4, 2016

(54) SERVER OF A COMPUTER NETWORK

(75) Inventors: Christof Boensch, Pforzheim (DE); Niklas Kramer, Bietigheim-Bissingen (DE); Juergen Fronius, Walheim (DE)

(73) Assignee: Komet Group GmbH (DE)

( * ) Notice: Subject to any disclaimer, the term of this patent is extended or adjusted under 35 U.S.C. 154(b) by 737 days.

(21) Appl. No.: 13/302,206

(22) Filed: Nov. 22, 2011

(65) Prior Publication Data

US 2012/0303674 A1  Nov. 29, 2012

Related U.S. Application Data

(60) Provisional application No. 61/510,816, filed on Jul. 22, 2011.

(30) Foreign Application Priority Data

Nov. 25, 2010  (DE) .................. 10 2010 052 556
Nov. 25, 2010  (DE) .................. 20 2010 017 375 U
Jul. 22, 2011  (DE) .................. 10 2011 108 361

(51) Int. Cl.
*G06F 19/00*  (2011.01)
*G06F 17/30*  (2006.01)

(52) U.S. Cl.
CPC ................ *G06F 17/3056* (2013.01)

(58) Field of Classification Search
CPC ............................................. G06F 17/30002
USPC ..................... 700/19, 31, 169, 175; 707/802
See application file for complete search history.

(56) References Cited

U.S. PATENT DOCUMENTS

| 6,385,502 | B1 * | 5/2002 | Takagi et al. ............... 700/169 |
| 6,401,056 | B1 * | 6/2002 | Sirois .......................... 702/184 |
| 2001/0000805 | A1 * | 5/2001 | Kadono ...................... 700/182 |
| 2002/0133264 | A1 * | 9/2002 | Maiteh et al. .............. 700/182 |
| 2006/0004786 | A1 | 1/2006 | Chen et al. |
| 2006/0149412 | A1 * | 7/2006 | Fujishima et al. .......... 700/169 |
| 2006/0220866 | A1 * | 10/2006 | Dixon et al. ............. 340/572.1 |
| 2010/0095824 | A1 * | 4/2010 | Laib ............................ 83/549 |
| 2010/0154051 | A1 * | 6/2010 | Bauer ........................... 726/15 |

FOREIGN PATENT DOCUMENTS

| CN | 101592938 A | 12/2009 |
| CN | 101770222 A | 7/2010 |
| DE | 11 2004 000349 T5 | 2/2006 |
| EP | 0 214 666 A2 | 3/1987 |
| EP | 0 462 279 A1 | 12/1991 |
| JP | 2004-265034 A | 9/2004 |
| JP | 2007-102625 A | 4/2007 |
| JP | 2007-264824 A | 10/2007 |
| JP | 2008-296301 A | 12/2008 |

* cited by examiner

*Primary Examiner* — Kenneth M Lo
*Assistant Examiner* — Chad Rapp
(74) *Attorney, Agent, or Firm* — Donald R. Boys; Central Coast Patent Agency, Inc

(57) ABSTRACT

The invention relates to a server connected to a network on which a database application is running for collecting and managing data. The server is connected to several machine tools and has means for receiving identification data and/or identification data and/or operating parameters and/or dynamic information items with respect to the tools. Static information about the tools are stored in the database, and the server processes the received data, parameters and information items to generate updated information about the tools.

22 Claims, 9 Drawing Sheets

SERVER OF A COMPUTER NETWORK

CROSS-REFERENCE TO RELATED DOCUMENTS

The present application claims priority to U.S. provisional application 61/510,816, filed Jul. 22, 2011, and to German applications 10 2010 052 556.1, filed Nov. 25, 2010, German application 20 2010 017 375.2, filed Nov. 25, 2010, German application 10 2011 108 361.1, filed Jul. 22, 2011, which are incorporated herein in their entirety, at least by reference.

DESCRIPTION

The present invention relates to a server of a computer network which is connected to the network via a communication link and on which a database application is running which is designed for collecting and managing data.

Such servers are known in the most varied embodiments for the most varied applications from the prior art. The server can be designed as an independent computer on which a server software and the database application is running. As an alternative, the server can also be designed as a server software which is running on any computer. In this context, it is conceivable that the computer is not exclusively provided for processing the server software but also for other tasks.

Furthermore, it is known from the field of machine tools from the prior art to provide tools and/or tool holders with an unambiguous identification which, for example for the purpose of tool management, can be read in by the machine tool and interpreted and processed in such a sense that the machine tool has knowledge at any time about which tools are located in a tool magazine and which tools are located in a tool spindle or are in use. The identification of the tool or of the tool holder, respectively, is attached, for example, in such a manner that it can be read in contactlessly by the machine tool. This is known, for example, from EP 0 214 666 A2. It is also known from EP 0 462 279 A1 to store in a memory provided on the tool holder additional information with respect to the tool which, if necessary, can be read out by the machine tool and taken into consideration by a control program running on the machine tool. Such information is, for example, the length, the diameter or the wear of the tool.

The identification data of a tool or tool holder are stored on suitable storage means, for example in the form of a bar code, a so-called QR code, a data matrix, an RFID tag. The storage means for the identification data of the tools and/or tool holder can be attached on these from the outside and/or integrated in them. The identification data stored on the storage means can be read out contactlessly optically, via a radio link or in any other manner. For this purpose, the machine tool has suitable readers.

In the machine tools known from the prior art, the evaluation and processing of the identification data of the tools or tool holders and of additional information about the tools, related to the identification data, is restricted to the respective machine tool. If, for example, further information, for example the duration of utilization and/or type of utilization of the tool, are detected and stored in a first machine tool for a particular tool identified by means of the identification data, this additional information, after the tool has been moved into another machine tool, is no longer available there. A worn tool which is used for the first time in a particular machine tool is considered there to be a new tool since there is no information available about duration of utilization and/or type of utilization of the tool.

In addition, the type and range of data processing is very restricted in the known machine tools. The data processing is restricted to the determination of information about the current position of a tool in the machine tool (in the tool magazine, in the spindle or in use) and to the determination or processing of correction data for the individual tools in dependence on their dimensions and on their wear. Data processing going beyond individual tools or even beyond machine tools, for example as part of a statistical evaluation of information, data and/or operating parameters allocated to several tools of several machine tools cannot be implemented in the prior art.

In the development and production of tools for machine tools, the tool manufacturers, as a rule, rely on their years of technical experience. There is scarcely any feedback from the serial use of the tools to the tool manufacturers. If at all, tools are returned to the tool manufacturer which are examined there with respect to the damage to the tool and the causes in the case of an extremely unusual tool failure. However, the examination of tools is restricted to a few individual cases and in the case of the information about the utilization of the tool before and at the time of the occurrence of the damage which are needed for determining the causes, the tool manufacturer has to rely on the information provided by the tool user. As a result, the determination of the cause of damage is frequently long drawn out and involves a great amount of work, and in some cases a precise determination of causes is even impossible or wrong causes are determined since the information from the user is not correct or incomplete. Consideration of tool damage and its causes occurs in only a very few exceptional cases in the future production of other tools of this type and/or in the development and production of future tools.

On the basis of the prior art described, the present invention is based on the object of being able to observe the life cycle of a tool for machine tools better, particularly gaplessly and more reliably in order to supply the tool manufacturers and possibly also authorized third parties with additional information of any type and more reliable information on the duration of utilization, type of utilization, lifetimes etc. of the tools in order to achieve in this manner an added value for users and manufacturers of the tools.

To achieve this object, it is proposed on the basis of the server of the type initially mentioned that the server is connected directly via the communication network or indirectly via further servers of the network to several company-internal machine tools, allocated to different companies, and/or other devices for resharpening, recoating, testing, measuring or evaluating tools and/or workpieces, the server has means for receiving identification data from tools or tool holders of the machine tools and/or identification data and/or operating parameters of the machine tools and/or dynamic information items with respect to the tools, static information about the tools, allocated to the identification data, stored in the database application and the server has means for processing the received dynamic information, the static information from the database and/or the operating parameters of the machine tools in order to generate updated information about the tools, the information content of the updated information going beyond the sum of the information content of the received dynamic information of the static information from the database and the operating parameters.

The other company-internal devices, allocated to different companies, for resharpening, recoating, testing, measuring or evaluating tools and/or workpieces to which the server of the network is connected preferably via further servers are, for example, any processing machines for refurbishing tools, presetting systems, measuring instruments, coating systems, labeling devices, storage locations for tools (e.g. consignment stores or tool cupboards with book removal), or other acquisition and communication facilities such as, e.g., MES/BDE (operating data detection) terminals, mobile telephones and PC-related devices for calling up article information items or sectional data recommendations etc. from the server, that is to say arbitrary further data receivers, transmitters and/or users.

According to the invention, it is thus proposed to interconnect not only individual or several machine tools within a company or a company site, but a number of machine tools and/or further data receivers, transmitters and/or users, distributed over different, spatially distributed companies or company sites. To interconnect the machine tools and/or the further data receivers, transmitters and/or users with one another, a communication network is used which can be an arbitrary telecommunication network, especially the Internet. Via the communication network, the machine tools and/or the further data receivers, transmitters and/or users can transmit any information items which flow together in the server according to the invention. The information items transmitted are especially identification data of the tools or their tool holders, used or present in the machine tools and/or the further data receivers, transmitters and/or users, identification data of the machine tools and/or operating parameters of the machine tools. Operating parameters are, for example, the rotational speed, the advance and/or time of use of a machine tool for a particular tool. However, the transmitted information items can also be typological machine information items, i.e. type-related information relating to the production systems such as, for example, construction of the machine tools (e.g. gantry, portal, console, transfer roads, rotary tables etc.), number of relative degrees of freedom between spindle and tool (number of NC axes), a stiffness matrix (e.g. relative, absolute, static, dynamic) or stability diagrams which can actually be associated with the tools covered.

The value-added information items gained by means of the invention can be used for the adaptation or optimization of the conditions of use and for improving the safety of the tools. Thus, for example, information items, particularly parameters of utilization which are collected in the machine during the utilization of the tool, can be utilized for adapting the conditions of use, for example for increasing or reducing the speed of advance, the cutting speed, the service lives etc.

By means of the typological machine information items, a machine classification can be carried out in the server which can then be allocated to the individual tools, tool types and materials. This result of a differentiation can be supplied, for example, as input quantity vector to a neural network which can make predictions about the tool, the tool holder and/or the machine tool used. The neural network can be designed to be self-learning so that by means of the increase in the case examples acquired and an adaptation of the evaluation criteria, increasingly more precise predictions can be made. The more typological information items from more machine tools are available and can be evaluated, the more reliable therefore is the prediction about the tool, the tool holder and/or the machine tool.

Naturally, a prediction on the basis of the typological information items can also be made in another way than by means of a neural network, for example by means of grouping formation and/or a statistical evaluation.

The predictions made relate, for example, to the presumable remaining life (service life) of the tool or of the machine tool, a future wear of the tool under given conditions of use, optimum operating parameters of the machine tool for the respective case of application, especially taking into consideration the estimated future wear of the tool, a point in time when a change of the cutting plates or of the entire tool is presumably imminent and any other tool and/or machine-related statements directed towards the future.

By means of the processing-specific, tool-specific and especially material-specific information items, a workpiece/material classification can be carried out in the server wherein the various classes can then be allocated in turn to the tools and tool types. As a result, a much more accurate and reliable assessment of the processability and the expected life (service life) of the tool or of the machine tool is possible.

The identification data allocated to the tools or the tool holder, respectively, are stored in a manner known per se from the prior art on suitable storage means which are arranged on or in the tool or the tool holder, respectively, and can be read out contactlessly by suitable reading means such as, for example, logistic readers from the store/stock administration areas (e.g. also for inventory purposes etc.), of the machine tool. Naturally, it is also conceivable to provide separate reading means which are connected for the purpose of transmitting the information items read in to the machine tools. Similarly, it is conceivable that the machine tool reads in the identification data by means of contacting methods, e.g. by means of a keying pattern. Thus, each machine tool has at any time an overview of which tools are present in the machine tool and of the position of the tools in the machine tools, especially which tools are or were in use. These information items and other information items are transmitted by the machine tools to the server via the communication network.

Furthermore, it is conceivable that the identification data allocated to the tools or the tool holders, respectively, are read in by a presetting device or a tool management program. Using a presetting device, a tool can be surveyed before it is used in a machine tool, for example with regard to the cutting positions of the tool. For this purpose, measuring instruments are provided instead of a workpiece in the presetting device. The presetting device determines correction values which are considered when the tool is used in the machine tool. For this purpose, a correction corresponding to the correction values can either be performed manually in the machine tool. As an alternative, the correction values can be transferred to the machine tool and considered there automatically when the tool is used. The correction values can be transferred manually or via a data communication link between presetting device and machine tool.

In the database application of the server, static information items about the tools, associated with the identification data, are stored. The static information items are, for example, type of the tool, manufacturer, date of manufacture, dimensions of the tool, number of cutting plates, material, etc. The tools used are, in particular, tools for the machining of workpieces. The type of tools is, for example, a drill, blade, milling cutter, precision lathe, abrasive tool, honing tool, a grinding stone or disk, a friction piece for lapping a workpiece, finisher tape or stone or any other tool for machining workpieces of metal or other materials.

Naturally, the invention can also be used for other tools, for example for metal-forming tools, particularly punching/stamping tools but also for deep-drawing dies, molds and stamps etc. In principle, the invention can be used for any type of machine tool which is subject to abrasive wear and thus to a known finite life. The type and range of the static information items stored in the database application depend greatly on the type of tool, on the capacity of the database forming the basis of the database application and of the storage media, and on the required accuracy and reliability of the updated information items to be calculated.

Apart from the identification data which provide for an unambiguous identification of the tools or of the tool holders, respectively, in the server, the machine tools also convey other information items, for example dynamic information items about the tools, to the server. The dynamic information items conveyed are, for example, period and type of utilization of a tool, wear of a tool, information about a possible change of cutting plates, material and dimensions of the workpiece to be processed, etc. It is conceivable that individual tools and/or the associated tool holders are equipped with additional sensors, where the sensor signals can also be transmitted as dynamic information items to the server. It is thus conceivable, for example, to integrate a force, vibration or torque sensor in a tool holder, which sensor detects during the use of the tool the force or torque values acting on the tool and transmits them by suitable sending means, preferably contactless, to corresponding reading means of the machine tool. From there, these data can then be transmitted to the server according to the invention. Dynamic information can also be information about the environmental conditions at the site where the tools are used. It is thus conceivable, for example, that suitable sensors, for example for detecting the temperature and/or the moisture and other variables in the case of ultra-fine processing, are provided in the environment of the machine tools or in the machine tools themselves. Furthermore, sensors can be used for general process monitoring for detecting dynamic process parameters during the use of the tool. These process parameters, too, can be transmitted to the server. Furthermore, the quantity of the cooling agent, grinding agent or lapping agent used with a particular tool can also represent a dynamic information item which is transmitted from the machine tool to the central server.

By means of the received identification data for the various tools, it is possible to determine accurately and unambiguously in the server by means of the static information items stored in the database which tools are currently present or being used in which machine tools. The server also has means for processing the received dynamic information items, the static information items from the database and/or the operating parameters of the machine tools. By means of suitable processing of the information items flowing together in the server, an informative added value can be generated which can be provided to the tool manufacturers and third parties. The processing of the information items can take place tool-specifically, that is to say separately for each of the tools, but also non-tool-specifically for several similar or different tools, if necessary even for tools from different machine tools in different companies or at different company sites, respectively, and/or for tools from different manufacturers. In this manner, independent, representative average values, independent of deviations in the individual case for particular tool types, which allow a reliable statement to be made about the quality and life (service life) of the tools of this tool type, can be determined, for example by statistical evaluation of the available static and/or dynamic information items and operating parameters. These information items can be taken into consideration, for example at the tool manufacturer in order to adapt, that is to say to increase or to reduce, the quality, reliability and/or service life of the tools of this tool type in future.

Naturally, the determination of the quality or service life of a tool of a particular type is only one of numerable possibilities for the use of the server according to the invention for generating updated information having an informative added value compared with the sum of the individual information items. By means of the service life determined for a particular tool type, the presumable remaining service life of the tool or, respectively, when a change of the cutting plates or of the entire tool is presumably imminent, can be determined by means of the information about the previous period of use of a tool of this type. The production and delivery of corresponding tools and the generation of associated bookkeeping measures (e.g. coordination of the reception of goods, creating and sending out delivery note, creating invoice, ordering shipping, balancing quantities of stock, initiating and monitoring ordering processes, and supplying shipment tracking systems or ordering devices with data) at the tool manufacturer can be coordinated reliably and early thanks to these information items. By means of the information items stored in the database of the server, the stock of tools is not only known but also located.

To be able to safeguard the consistency of the data stored in the database, only raw or basic data, i.e. no data preprocessed or weighted already in the area of the tool, the machine tool and/or the company are preferably stored in the database and used for determining the added-value information. Otherwise, there would be a risk that the data would be preprocessed or weighted differently in the area of the tool, the machine tool and/or the company as a result of which there would be problems with the consistency and uniformity of the content in the database.

Third parties who are provided with access to the updated information items generated in the server are, for example, companies or company sites, where tools of a particular type monitored by the server are used, in order to be informed as comprehensively as possible about the current state and the future (service life) of tools used by them. This is because the extensive evaluation and processing of information effected by the processing means of the server enables not only for updated information about the actual state of the tools to be generated but, in the case of suitable evaluation, even provides reliable information about the future of the tool, for example in the form of the presumable further service life of the tool until it is blunt or defective. It is important, especially for generating information about the future of the tools, to be able to access information about as many tools as possible and the corresponding operating parameters of the machine tools and evaluate these which is only possible by using the server according to the invention.

It would also be conceivable that third parties who have access to the server and the information stored there obtain the possibility of programming, on the basis of the existing database arrays, new functions or algorithms for evaluating the information and data contained in the database and for generating individual added-value information items or supplementary database arrays. These new functions, algorithms or database arrays can then be offered and sold by the third parties as service, for example as part of an application (so-called "App"). For this purpose, the database structure is disclosed, the content of the database, i.e. the information and data stored therein, remaining secret or anonymous, respectively, i.e. not being accessible to the third parties.

In addition, the present invention has a multiplicity of further advantages. For example, it is possible to link a particular tool with a multiplicity of further information items via the individual code, that is to say via the identification data of the tool or of the tool holder, respectively. In the context of a quality assurance at the tool manufacturer, the causes for a tool failure can be found more simply in the case of a complaint by the tool user by allocating measurement values, production data etc. to particular tools. Additional possibilities exist, for example, in a selective recall of a particular batch of tools produced. In the context of the production of the tools, it is conceivable, for example, to use the individual codes for identifying workpieces or the tools made from them and guiding them through the production (discarding order papers).

In the context of a control of goods received at the customer (user of the tools), the unambiguous identification of tools can provide for automatic downloading of test programs, drawings, technical specifications, etc. for a control of receipt of the incoming tools.

In the context of a tool presetting by means of a presetting device, assembled tools can be identified by means of the individual codes, particular setting values, cutting data recommendations etc. can be allocated to the various tools. Furthermore, it is conceivable to automatically download corresponding setting programs for the machine tools from the server according to the invention in dependence on the individual codes of the tools.

In the context of NC programming at the user in a company, the individual codes of the tools allow the automatic downloading of corresponding cutting data recommendations, collision consideration models (2D, 3D) etc. for the machine tools. In the context of a utilization of the tools, individual codes provide for the determination of the tool setting times, cutting data, quality of the components produced by means of the tools etc., the transmission of these determined values to the server and the allocation of the determined values to a particular tool or tool type, respectively. It would even be conceivable to deliver a best-practice recommendation for the tool by means of the information contained in the database. However, since such a recommendation is dependent on the surrounding machine tool system, information about the machine tool (e.g. manufacturer, type, year of construction etc.) and possibly other user-dependent information should be stored for the determination of a best-practice recommendation.

In the context of a purchase/processing, the individual codes enable, for example, spare receptacles or cutting plates in other tools to be identified. Apart from the information items mentioned, arbitrary information items of tool manufacturers, dealers, customers (the users of the tools) etc. can be additionally determined and allocated to particular tools via the individual code and taken into consideration in the generation of the updated information.

In the context of a regrinding service for sharpening of blunt tools or cutting plates, the individual codes of the tools provide for the automatic downloading of corresponding drawings, information about the cutting material/the coating, machine programs, the number of regrinds already performed and/or still possible, customer information, original order numbers, etc. Furthermore, for the purpose of tool conditioning, information about the tool can also be called up from the server, for example usage parameters such as period of use, distance traveled, number of workpieces machined, number of (error) data generated during the previous operation, etc. After completed tool editing, defined data allocated to the tool are preferably stored in the database, which show that editing of the tool has been performed and type and range of the editing.

Each identification code of a tool or of a tool holder, respectively, is unique and can be specified unambiguously (with regard to tool type and single piece of a tool) for each tool and even for each installed part of a tool. Each code is unambiguously allocated to a particular database entry. Under the respective database entry, all information items are stored which apply to a particular tool type, and also for each individual single part of a tool if the single parts of the tool have an individual identification code or, respectively, the database entry refers to these information items. The identification code is, for example, a number/letter combination which is stored on a storage element (for example RFID tag, data matrix, bar code, QR code etc.) which can be read out automatically visually, by radio or automatically in any other way. The storage element can preferably not store any additional information apart from the identification code. However, it is also conceivable that during the use of the tool or thereafter, arbitrary information items can be stored in the storage element, for example usage parameters of the tool. Such a storage element is, for example, designed as a recordable RFID tag. This information, too, can be read in and transferred to the server and stored in the database. From there, the information can be interrogated during the tool editing and utilized for optimizing the tool editing.

Naturally, it is conceivable that individual identification codes are in each case allocated not only to the tool in its entirety but also to the individual parts of the tool, and are stored on the individual parts. Individual parts of a tool are, for example, the tool holder, the tool receptacle, cutting plates or rotating cutting plates, extensions etc. The individual codes of the individual parts can also be read in and stored in the database. In the database, information relating to a multiplicity of individual parts is then stored. The various tools are virtually assembled from the individual parts in the database or a processing unit allocated to the latter so that it is always known from which individual parts a particular tool is assembled. If then a tool is newly assembled from different individual parts, for example comes into a new receptacle, the extension is exchanged or a cutting plate is replaced, this can be updated without problems in the database.

The database contains relational freely configurable arrays. Each array can be supplemented and provided with information. For all arrays of the database, there is an individual read/write permission. The database allows the virtual assembly and disassembly of tools or, respectively, of the individual modules of a tool, for example cutting plates on drills in a receptacle, from which location/position, overall dimensions etc. of the assembled tool can be obtained. The identification is made for the entire tool via each identification code existing in the assembly.

As a rule, enquiries by third parties to the server comprise an identification code or another definition (e.g. article number, designation or the like) of the corresponding tool and an authorization code which substantiates the authorization of the third party for obtaining the requested information. Such an authorization code can be allocated to the third party by the operator of the server. The code is generated, for example, by means of information about the site of the requesting device, information for identifying the requesting device and the requested information. Thus, a purchase information or a geometry information item can then be supplied customer-specifically. Any misuse or password entry would be prohibited and a conversion of the device (sale of a used device to strange third parties) would not allow any abusive or unlawful data callup, either. It is only when the server confirms the authorization of the requesting station by means of the authorization code transmitted that the desired information relating to the tool according to the identification code or other definition is transmitted. Thus, for example, a tool presetting device can automatically download type, description, dimension and other data of the tool at the customer, that is to say at the user of the tool. A purchaser, in contrast, can determine type, item price, ordering conditions and/or in-house stock of cutting plates, using a drill base body as an example. These information items will even allow the purchaser to determine planning data, range, terms and other disposition data for stock management.

According to the invention, the information from the database is compressed at a higher level in order to obtain the informative added value. For example, the number of identical articles (for example tools or cutting plates) can be determined at the customer or purchaser. For this purpose, it must also be possible to flexibly allocate a code of a location of use of the tool to a particular hierarchy. For example, the code of the location of use should take into consideration when a setting device is standing in a plant A of a customer B, is sold and is then standing in another plant C or at another customer D. The new plant C or the other customer D can be an updated information item which is stored in the database for updating the stored data.

Finally, it is conceivable that third parties, for example tool manufacturers, customers (users of the tools) or any others transmit data and information back to the server which are stored in the database entry in dependence on the read/write location. It is thus conceivable, for example, that the cutting plate used and cutting data are stored in dependence on the drill used and machine used. When the same drill is used on another machine, other cutting plates may be used under certain circumstances and other cutting data will result.

By linking cutting plates, receptacles, tools and presetting devices and machine tools, interesting information on the usage characteristics of the customers can be raised on a compressed level—also rendered anonymous. These comprise, among other things, frequency of utilization, period of use, replacement times etc. In this context, both an application characteristic altered in comparison with its history and a comparative evaluation between different application sites are of great interest to the tool suppliers. For example, variation ranges of times of use, significant differences, at country level for example, can be evaluated machine- or customer-specifically etc. Concrete studies about the improvements experienced by customers due to product innovations are also possible.

All these information items flowing together in the server can be determined and evaluated by suitable statistical analyses of the data and information items located on the central server. These information items then have a considerable informative value for the tool manufacturers and arbitrary third parties, which value can be made accessible and provided to these as part of an operator model, for example at a cost or as a service. When the present invention is used at the ultimate customer (the users of the tools), the model additionally allows the tool manufacturers and third parties to draw conclusions relating to increases in productivity achieved. This can be used for price negotiations with the customers or even contractually negotiated as a basis for a future price development. If the system is designed in such a manner that, for example, a server calibration takes place mandatorily in the machine tool so that a deceit in the sense of a prohibition or circumvention of the data and information transmission from the machine tools to the server is impossible, a life-cycle-cost consideration of the machine tools, of the tools or tool holders used by them, respectively, can take place and even a sales model based on a "pay per part" (payment per processed workpiece) or "pay per feature" (payment per geometry element), especially "pay per hole" (payment per drilled hole) can be worked out.

Further features and advantages of the present invention will be explained in greater detail with reference to the figures in the text which follows. In this context, the said features, both by themselves and in arbitrary combination with one another, form the subject matter of the present invention. In the figures.

Figure 1:
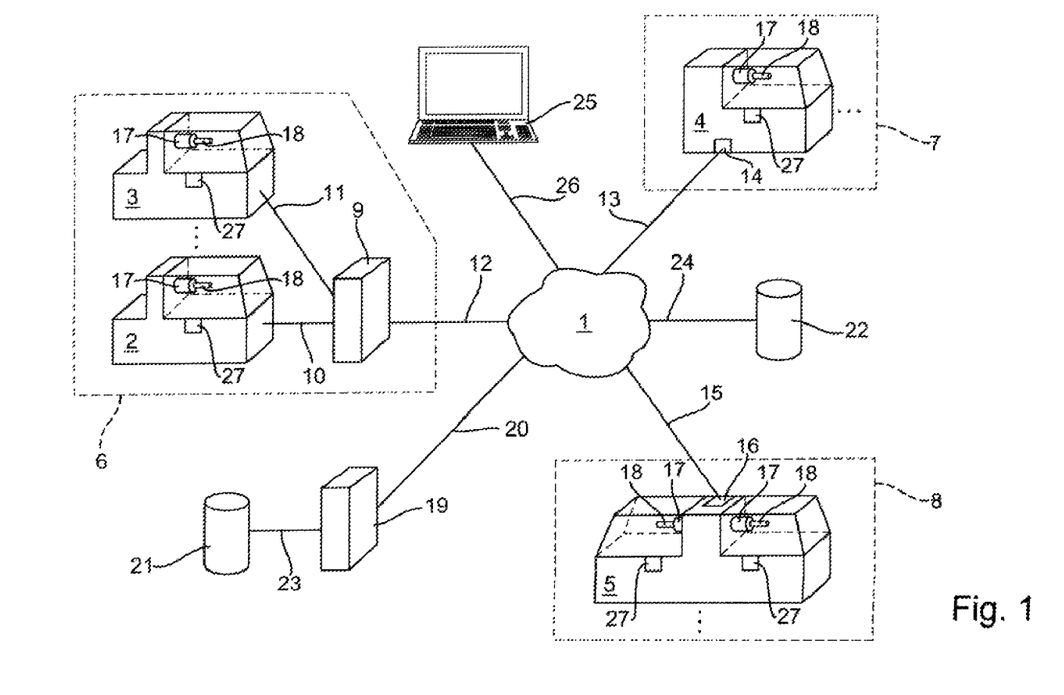
FIG. 1 shows a computer network with a server according to the invention according to a first preferred illustrative embodiment.

In FIG. 1, a communication network is designated by the reference symbol 1. The communication network 1 can be designed as an arbitrary network for transmitting data, especially as the Internet. The communication network 1 is only shown symbolically as a cloud in FIG. 1. However, the precise formation of the communication network 1 is known to the expert from the prior art.

Various subscribers in the form of machine tools 2, 3, 4, 5 are connected to the communication network 1. The machine tools 2 to 5 are spatially arranged preferably at different sites 6, 7, 8. The different sites 6 to 8 can be different companies or company sites, respectively. The machine tools 2, 3 are connected indirectly to the communication network 1 via a server internal to the company. The data transmission between the machine tools 2, 3 and the server 9 can take place over data transmission lines 10, 11 in accordance with an arbitrary transmission protocol. In particular a data transmission by means of a company-internal proprietary protocol or the IP (Internet Protocol) is considered. The data transmission between the server 9 and the communication network 1 via a data transmission link 12 can also take place in accordance with an arbitrary data transmission protocol. If the communication network 1 is constructed as the Internet, the data transmission via the data link 12 preferably takes place in accordance with the IP. The server 9 is thus preferably constructed as an Internet server. Naturally, other machine tools apart from the machine tools 2, 3 shown can also be connected to the server 9 which is indicated by the three dots between machine tools 2 and 3. The further machine tools connected to the server 9 can also be arranged within the site 6 or spatially separate from this, for example in another company or company site, respectively.

The machine tool 4 and possibly other machine tools, which is indicated by the three dots to the right next to machine tool 4 are arranged at site 7 and connected directly to the communication network 1 via a data transmission link 13. The data transmission between machine tool 4 and the communication network 1 via the data link 13 takes place in accordance with an arbitrary protocol, especially in accordance with the IP. To edit the data to be transmitted in accordance with the transmission protocol used, the machine tool 4 therefore has a suitable interface 14 with hardware and software to meet the requirements of the interface function.

Finally, the machine tool 5 and possibly other machine tools, which is indicated by the three dots below the machine tool 5, is arranged at site 8. Machine tool 5 and possibly the other machine tools of site 8 are connected directly to the communication network 1 via a data transmission link 15. The data transmission between machine tool 5 and the communication network 1 via data link 15 can take place in accordance with an arbitrary protocol, particularly in accordance with the IP. To edit the data to be transmitted, the machine tool 5 therefore has a suitable interface 16 which acquires hardware and software for meeting the requirements of the interface function.

Naturally, it is conceivable that more than the machine tools 2 to 5 shown and more than the sites 6 to 8 shown are provided. Furthermore, it is conceivable that the machine tools of a particular site are partially connected indirectly via a server and partially directly to the communication network 1. The connected machine tools 2 to 5 are preferably constructed as machine tools for cutting processing of workpieces. Machine tools 2 to 5 are constructed in particular for drilling, turning, milling, honing, grinding, lapping, finishing or sawing and have corresponding tools. Each of the machine tools 2 to 5 usually has several tools deposited in a tool magazine and is equipped with the corresponding tool for machining the workpiece for a desired machining step. The machine tools can have so-called turret mounts which can be equipped with several tools. Thus, it is only necessary to bring the desired tool into the machining position by moving the tool turret for the various machining steps and the different types of the machining of the workpiece without having to access the tools contained in the tool magazine for each machining step. Relatively complex machine tools 2 to 5 are known which have umpteen different tools in their tool magazine, even up to 100 tools, and the tool turret of which can accommodate several different tools, up to 10 or more tools are conceivable. FIG. 1 shows in a greatly simplified manner only one tool mount 17 with one tool 18 held by it for each of the machine tools 2 to 5.

In addition, a server 19 according to the invention is also connected to the communication network 1 by a data transmission link 20. The server 19 has access to one or more databases 21, 22. The databases 21, 22 can be connected either directly to the server as is the case, for example, with database 21 which is connected to the server 19 via a data transmission link 23. It is even conceivable that the database 21 is an integral component of the server 19. As an alternative, the databases 21, 22 can also be connected to the communication network 1 as is the case, for example, with database 22 which is connected to the communication network 1 via a data transmission link 24. In this case, server 19 accesses the database 22 via data links 20, 24 and the communication network.

Naturally, more than the databases 21, 22 shown can also be connected to the server 19 or the communication network 1, respectively, which are accessed via the server 19. Finally, a client 25 is connected to the communication network 1 via a data transmission link 26.

As a basis for the present invention, the tool holder 17 and/or the tools 18 of the machine tools 2 to 5 are in each case provided with identification data allocated unambiguously to each of the tool holders 17 and tools 18, respectively, covering the area as much as possible. The identification data comprise an arbitrary combination of numbers and/or letters. The identification data can be stored in the form of a bar code, a data matrix, a QR code, an RFID tag or similar storage means. The storage means are preferably arranged on or in the tool holders 17 or the tools 18, respectively. The machine tools 2 to 5 have suitable reading means in order to read in the identification data of the tool holders 17 or of the tools 18, respectively, contactlessly. The reading means 27 operate optically in the case of bar codes, data matrix or QR codes, and preferably by radio in the case of RFID tags. The machine tools 2 to 5 transmit the identification data of the tool holders 17 or of the tools 18, respectively, to the server 19.

In the databases 21, 22, static information about the tools 18, allocated to the identification data, are stored. These information items comprise, for example, the type of tools 18 (for example drill, lathe, milling cutter, honing tool, grinding stone or disk, friction tool, finishing tape or stone or saws), the manufacturer of the tool, the material of the tool, number, type and model of removable cutting plates, cutting data recommendations for the tool, test programs for the tool, drawings or technical specifications of the tool, collision observation models (2D, 3D), etc. Using the received identification data of the tools 18, the server 19 can unambiguously determine what tools the observed tools or the tools used by the observed machine tools are. For the tools 18 considered, cutting data recommendations, article features according to DIN 4000 (for the description of a tool in order to find comparable tools), collision observation models, test programs, drawings or technical specifications or other matter can be taken from the databases 21, 22 and transmitted to third parties who have access to the server 19, for example via the client 25.

Apart from the identification data of the tools 18, any other information items can also be transmitted from the machine tools 2 to 5 to the server 19. Such information items comprise, for example, identification data and/or operating parameters of the machine tools 2 to 5. Using the identification data of the machine tools 2 to 5, the server 19 can determine accurately by means of additional information items, stored in the databases 21, 22, allocated to the identification data what type of machine tool is involved. The operating parameters of machine tools 2 to 5 comprise, for example, the speed of rotation, the speed of advance, an application time etc. This type of data is subject to temporal changes so that they are called dynamic information items.

The server 19 also has means for processing the received dynamic information items, the static information items from the databases 21, 22 and/or the operating parameters of machine tools 2 to 5. By means of a suitable evaluation and processing of the received information items and parameters, the server 19 according to the invention can generate updated information about the tools 18. The deciding factor is here that an abundance of different information items from a multiplicity of tools 18 and machine tools 2 to 5 is brought together in the server 19. This abundance of data and the fact that it is available at a central location, namely at server 19, enables updated information about tools 18 to be generated for the first time, the information content of the updated information going beyond the sum of the information content of the received dynamic information, the static information from the databases 21, 22 and the operating parameters. The server according to the invention thus provides a genuine added value of information compared with the prior art which can be used for improving and optimizing the production and service sequences both by the tool manufacturers and by any third parties.

Figure 2:
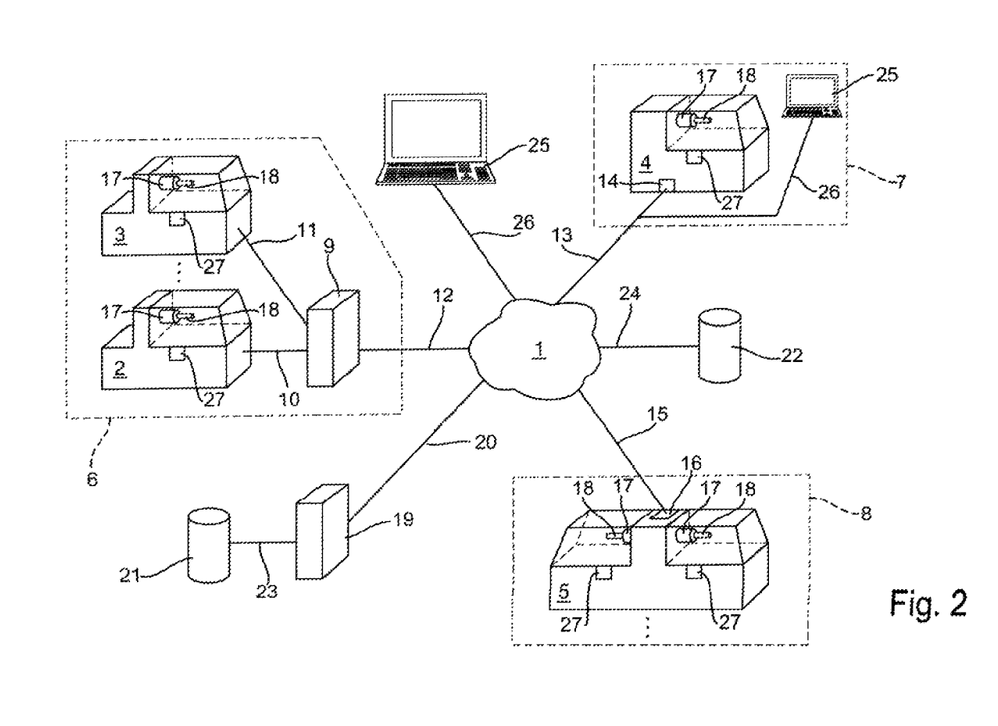
FIG. 2 shows a computer network with a server according to the invention according to a second preferred illustrative embodiment.

The client 25 can be arranged at any point in the network 1. It is thus conceivable, for example, that client 25 is arranged at an arbitrary site, for example site 7 (compare FIG. 2) in a company. The company, by accessing the server 19 via the network 1, receives via the client 25 value-added information with respect to the tool 18, for example a recommendation for an optimum use ("best practice") of the tool 18, and cutting data recommendations, collision observation models (2D, 3D) etc.

Figure 3:
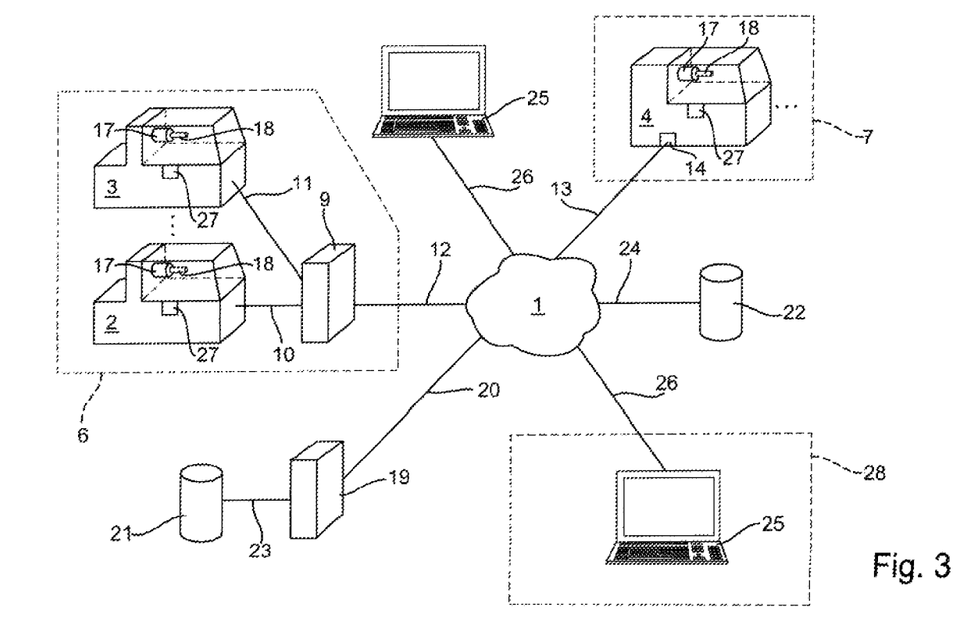
FIG. 3 shows a computer network comprising a server according to the invention in accordance with a third preferred illustrative embodiment.

It would be similarly conceivable that the client 25 is arranged at a tool manufacturer 28 (compare FIG. 3). In the context of a quality assurance at the tool manufacturer 28, the causes for a tool failure can be found more simply in the case of a complaint by the tool user, by allocating measurement values, production data etc. to particular tools 18. Additional possibilities exist, for example, in a selective recall of a particular batch of manufactured tools 18. In the context of the production of the tools 18, it is conceivable, for example, to use individual codes of the tools 18 for identifying, and directing through production workpieces or the tools 18 manufactured from these (dispensing with order papers).

Figure 4:
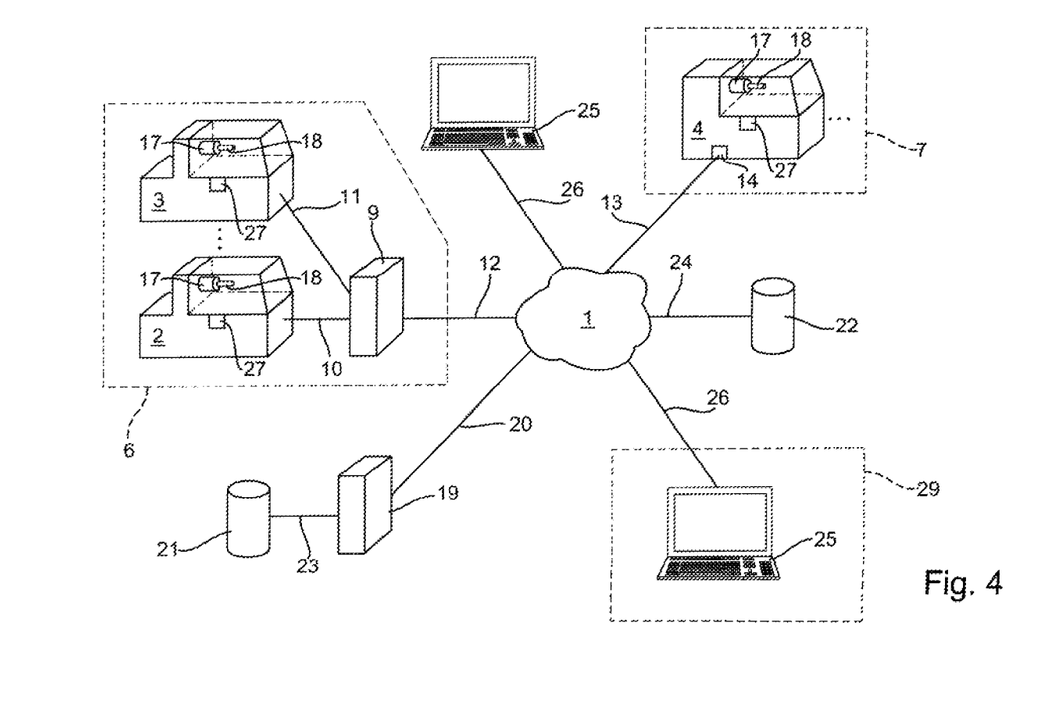
FIG. 4 shows a computer network comprising a server according to the invention in accordance with a fourth preferred illustrative embodiment.

Finally, it would also be conceivable that the client is arranged at a regrinding service 29 (compare FIG. 4). The individual codes of the tools 18 enable corresponding drawings, information about the cutting material/the coating, machine programs, the number of regrinds already performed and/or still possible, customer information, original order numbers, etc. to be downloaded from the server 19 via the network 1. Furthermore, information about tool 18 itself can also be called up from the server 19, for example utilization parameters such as period of use, distance traveled, number of workpieces processed, number of (error) data generated during the previous operation etc., for the purpose of tool editing. After the completed tool editing, defined data allocated to the tool 18 are preferably stored in the database 21; 22, which show that editing of tool 18 has been performed and the type and range of editing. Naturally, several clients 25 arranged distributed at arbitrary sites can also have access to the server 19 and the data and added-value information items stored therein.

The updated data with the added value of information content can be utilized by machine tools 2 to 5 in the company but also by machine tools arranged outside the company and by any processing machines for the reconditioning of the tools, regrinding machines, presetting devices, measuring systems etc.

Figure 5:
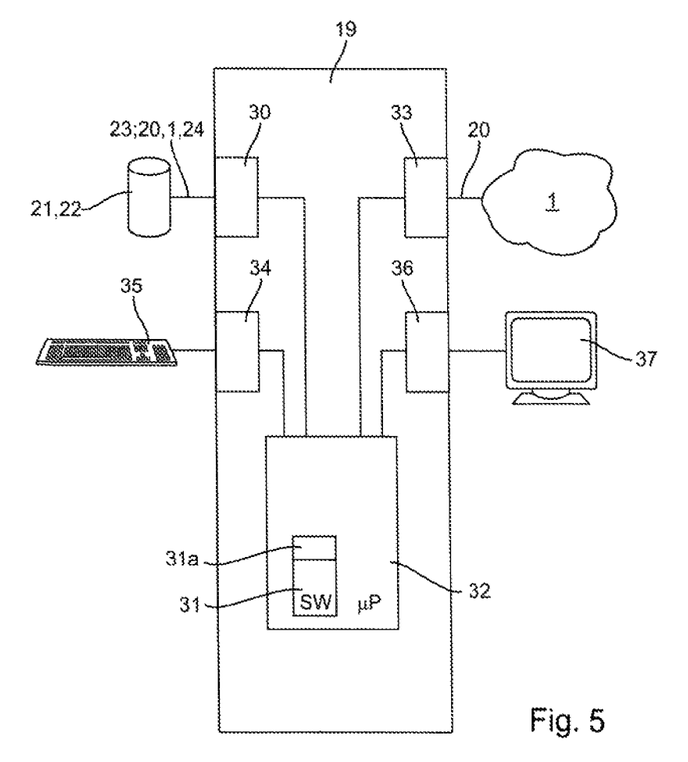
FIG. 5 shows a server according to the invention.

The server 19 according to the invention is shown in detail in FIG. 5. It comprises an interface 30 for communication and for data exchange with the databases 21, 22. The interface 30 is driven and managed by a database application which is part of a software 31 which is running on a microprocessor 32 of the server 19. In addition, the server 19 has an interface 33 for connecting the server to the communication network 1. The interface 33 is also driven and managed by software 31 capable of running on the microprocessor 32, or by a part thereof, respectively. Furthermore, server 19 has an interface 34 via which the input means, for example in the form of a keyboard 35, a computer mouse, are connected. The interface 34 is also driven and managed via a part of the software 31, particularly via an operating system of the microprocessor 32. Finally, the server 19 has an interface 36 via which output units, for example in the form of a computer screen 37, are connected. The interface 36, too, is driven by a part of the software 31, particularly by the operating system of microprocessor 32.

The processing means of server 19 which process the received identification data of the tools 18 and of the machine tools 2 to 5, the dynamic information items also received from machine tools 2 to 5 and possibly other information items or data from machine tools 2 to 5 and the static information items of the corresponding tools 18, obtained by means of the received identification data from the databases 21, 22, are implemented in the server 19 in the form of the software 31 or of a part 31a thereof, respectively. The software processing means 31a are capable of running on the microprocessor 32 and implement the desired evaluation and processing of the said information items for generating the updated information items about the tools 18. The processing and evaluation, respectively, of the information items by the software part 31a comprises in particular a statistical evaluation which also allows a reliable statement to be made about the future of the tools 18. Using these information items about the future of the tools, production and delivery times of spare tools can be coordinated and controlled, the use of the tools can be adapted to possible delivery dates of spare tools in order to maintain production and not bringing it to a standstill due to failure of the tools. The updated information items can also comprise information about duration of application and type of application of the tools 18 and the respective resultant service lives of the tools 18.

The updated information items with the added value contained therein, generated by the server 19, can be stored in one or more of the databases 21, 22. It is also conceivable that the updated information items or a part thereof are transmitted back to the machine tools 2 to 5. It is also conceivable that third parties have access to the information items stored in the databases 21, 22, including the updated information items, via the client 25. In this manner, tool application times, cutting data, collision observation models, test programs, drawings or technical specifications can be downloaded for the desired tools 18. Third parties who wish to access the server 19 or the databases 21, 22, respectively, via the client 25 are, for example, the operator of the machine tools 2 to 5 at the various sites 6 to 8. As an alternative, the third parties can also be the manufacturers of the tools 18 who are hoping to optimize their production processes by taking into consideration the updated information items. Before third parties obtain access to the server 19 or the contents stored in the databases 21, 22, respectively, via the client 25, the server 19 can check their authorization. In this manner, the updated information items generated by the server 19 and the data stored in the databases 21, 22 with respect to tools 18 can be offered to third parties with liability for charges so that the great expenditure for the installation of the infrastructure described and costs required for the procurement and maintenance of the infrastructure are at least partially paid for by the payments for utilization of the third parties.

Figure 6:
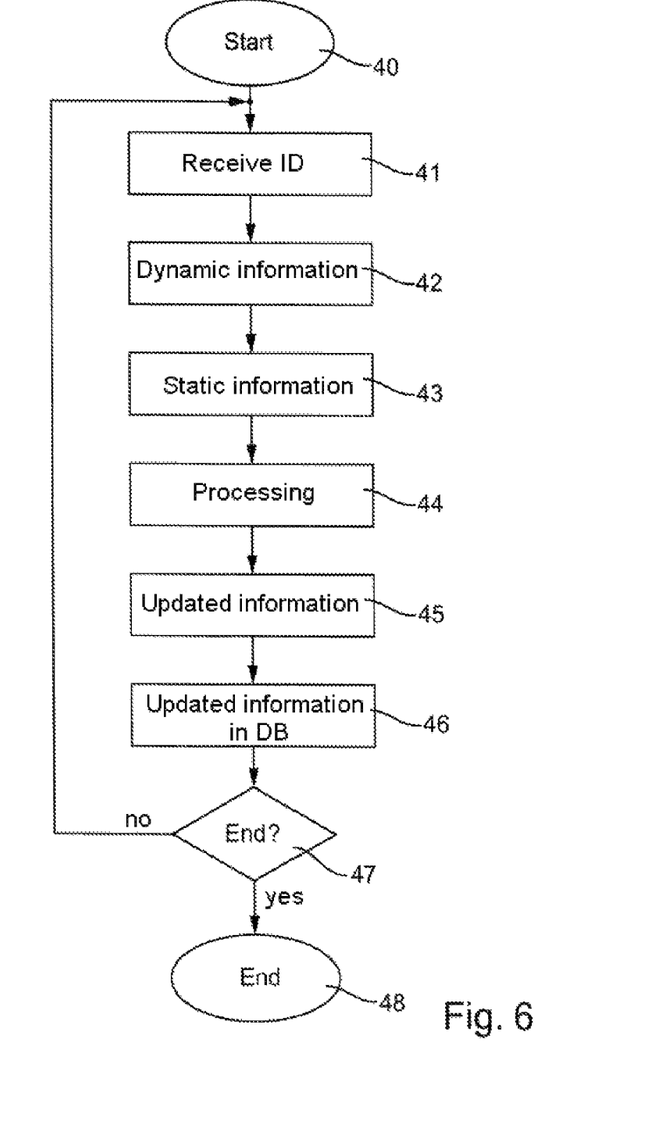
FIG. 6 shows a flowchart of a method for processing information on the server according to the invention.

FIG. 6 shows a software routine of software 31 by means of which the static and dynamic information items and the operating parameters of the machine tools 2 to 5 and possibly other information items are processed and evaluated and the updated information items are generated. The method comprises, for example, the following steps:

Start of method in step 40. In a step 41, the identification data of the tools 18, of the tool holders 17 and/or of the machine tools 2 to 5 are received. In a step 42, the dynamic information items with respect to tools 18 are received. In a step 43, the static information items corresponding to the received identification data are then loaded from one or more of the databases 21, 22. In step 44, the actual processing of the received or loaded data and information items then takes place in the server 19 for generating the updated information items 45. The updated information items can either be stored in the server 19 to be requested by a third party, for example via the client 25, or stored in one or more of the databases 21, 22 in a step 46. In a request step 47, it is requested whether the routine should be ended, for example on initiation by the operator of the server 19. If yes, the processing routine is ended in step 48. Otherwise, the program branches back to step 41 and runs again through steps 41 to 47.

Figure 7:
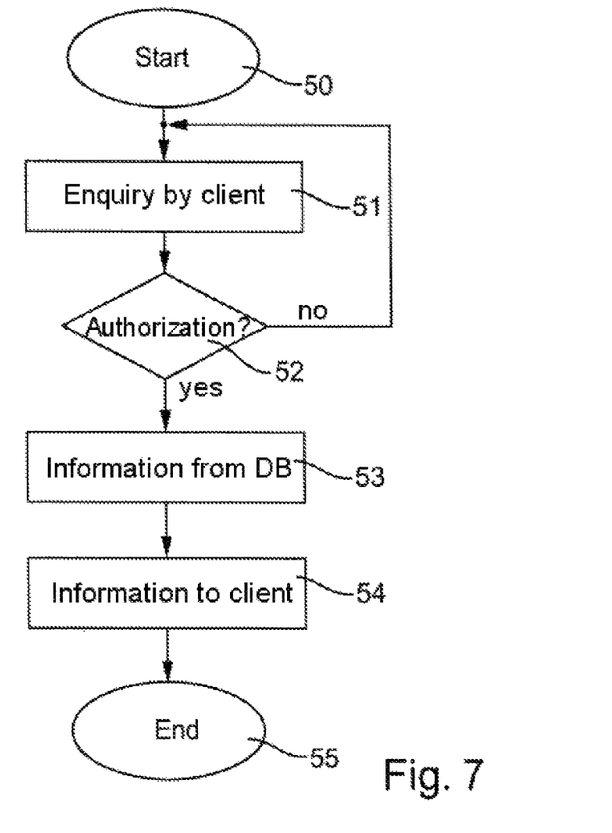
FIG. 7 shows a flowchart of a method for requesting the information from the server according to the invention in accordance with a first preferred embodiment.

FIG. 7 shows a flowchart of a software routine of software 31 which produces a request to the server 19 or the databases 21, 22, respectively, by the client 25. The method comprises, for example, the following steps: Start of the method in step 50. In a step 51, client 25 starts a request to the server 19. The request comprises an authorization code of client 25. In a request step 52, the validity of the authorization code is interrogated. If the client 25 is authorized for downloading the requested information items, the requested information items are loaded from the database 21; 22 in a step 53 and transmitted to the client in a step 54. Otherwise, the program branches back to step 51. In a step 55, the requesting routine is ended. Information about the requested information items can be contained either in the enquiry of the client 25 or stored in the server for the customer identified by the authorization code.

Figure 8:
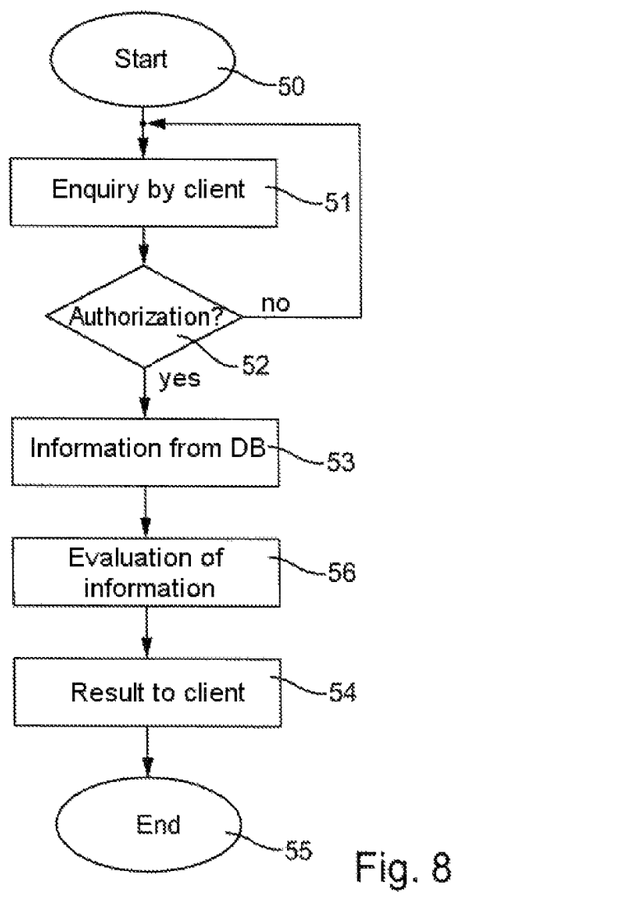
FIG. 8 shows a flowchart of a method for requesting the information from the server according to the invention in accordance with a second preferred embodiment.

FIG. 8 shows a further illustrative embodiment of a flowchart of a software routine of software 31 which produces a request to the server 19 or the databases 21, 22, respectively, by the client 25. In distinction from the flowchart from FIG. 7, a further step 56 is provided between step 53 (load information/data from database 21, 22) and step 54 (transmit information/data loaded from database 21; 22 to client 25). Together with his enquiry (step 51), client 25 can order at the same time a desired evaluation of the data by the server 19. For this purpose, the server 19 contains in this illustrative embodiment various standard processing algorithms, of which the client 25 can select one or more. The algorithms selected by the client 25 are transmitted to the server 19 together with the enquiry. In step 56, the evaluation or processing of the information/data loaded from the database 21; 22 then takes place in accordance with the desired algorithms. The result of the evaluation or the processed data, respectively, are then transmitted to the client 25 in step 54. This has the advantage that no further computer- and memory-intensive evaluation/processing of the information items/data from the database 21; 22 is required at the client 25.

The latter can thus be designed to be smaller and more cost effective. Under certain circumstances, data transmission capacity over the network 1 can also be saved since it is no longer necessary to transmit all data/information items read out of the database 21; 22 to the client 25, but only the result of the evaluation or the processed data, respectively.

Figure 9:
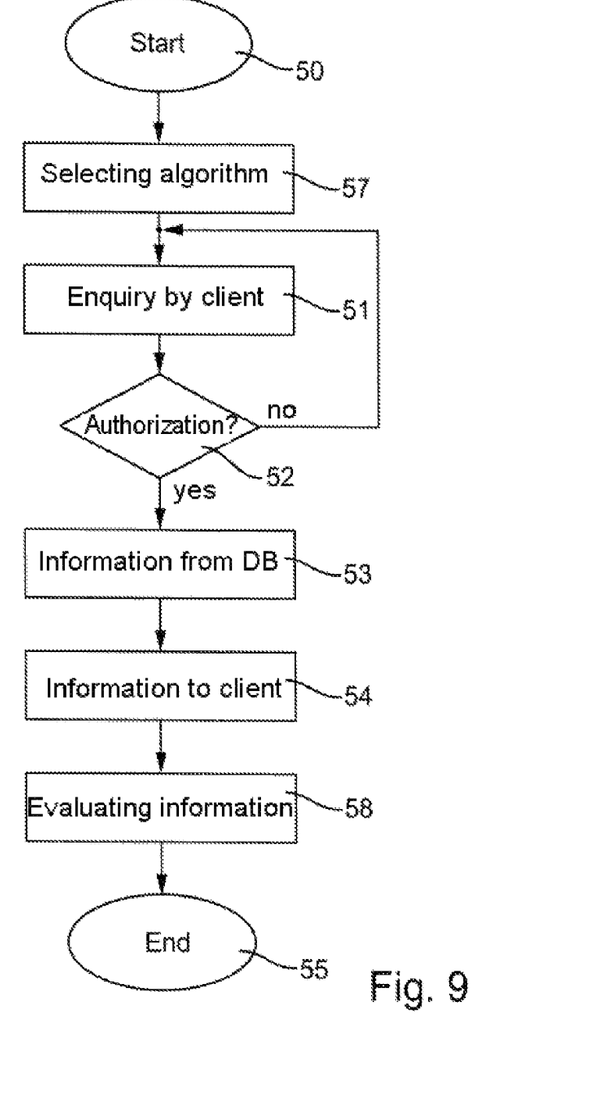
FIG. 9 shows a flowchart of a method for requesting the information from the server according to the invention in accordance with a third preferred embodiment.

According to a further illustrative embodiment from FIG. 9, the evaluation and processing of the data/information items from the database 21; 22 takes place not at the server but locally at the client 25. For this purpose, at least one desired algorithm for the evaluation/processing of data is first selected at the client 25 in a step 57. The data/information items required for the selected algorithm become the subject of an enquiry to the client 25 which is transmitted in step 51. The data/information items needed for the selected algorithm can be entered either manually by the user of client 25 or determined automatically by the client 25 by means of the selected algorithm. The enquiry is processed at the server 19 correspondingly described above for the illustrative embodiment from FIG. 7. The data/information items transmitted by the server 19 to the client 25 (step 54) are then evaluated/processed at the client 25 in accordance with the algorithm previously selected in step 57 so that the client 25 now has the desired information items.

The invention claimed is:

1. A system, comprising:
    a computerized managing server connected to a wide-area-network, coupled to a data repository, and executing software from a non-transitory medium;
    a database application as a part of the software;
    a plurality of company sites, each having a unique site identification code;
    one or more machine tools at each company site, the machine tool defined as a machine adapted for holding and shaping workpieces, each machine tool associated with a unique machine tool identification code;
    a tool holder as a part of each machine tool, the tool holder associated with a unique tool holder identification code;
    a plurality of shaping tools adapted for being held in the tool holder and driven to shape a workpiece, each shaping tool associated with a unique shaping tool identification code;
    sensors coupled to each machine tool, sensing operating conditions for each shaping tool in use; and
    local computerized apparatus at each company site, coupled to electronic circuitry at the one or more machine tools, coupled to the wide-area-network, and adapted to receive data from the electronic circuitry at the one or more machine tools, and to send and receive data over the wide-area network to and from the computerized managing server;
    wherein the local computerized apparatus transmits cutting tool locations relative to company site, machine tool, and tool holder, transmits dynamic data regarding shaping tool operating conditions for each shaping tool, including forces and time of application of said forces, to the computerized managing server, and wherein the database application executing at the computerized managing server retrieves from the data repository static information regarding each cutting tool, including at least cutting tool type and new condition, receives the dynamic data regarding each cutting tool, processes the static and dynamic data together, periodically generating updated status for each shaping tool, generates predictions, based upon the updated data, for each shaping tool, and provides access to subscribers to the updated data and predictions.

2. The system of claim 1 wherein the shaping tools are cutting tools adapted for removing, by cutting or grinding, material from the workpieces.

3. The system of claim 1 wherein the shaping tools are forming tools adapted for shaping workpieces by pressing the workpieces between parts of a die.

4. The system of claim 1 wherein the operating conditions sensed are forces applied between shaping tools and workpieces, and time of application of said forces.

5. The system of claim 1 wherein the operating conditions sensed are application to the shaping tool or the workpiece, of cooling agent, grinding agent or lapping agent, and time of application.

6. The system of claim 1 wherein the predictions generated are predictions regarding current and expected tool life related to operating conditions sensed.

7. The system of claim 1 wherein the predictions include a recommendation of a time to replace the shaping tool with a different shaping tool.

8. The system of claim 7 wherein the predictions include a recommendation for renewing individual ones of the shaping tools.

9. The system of claim 8 wherein renewing comprises sharpening by renewing a cutting edge.

10. The system of claim 8 wherein the recommendation for renewing is transmitted from the computerized management server to the local computerized apparatus, and is accompanied by instructions for renewal, including drawings.

11. The system of claim 1 further comprising one or more refurbishing machines adapted for refurbishing forming tools, the refurbishing machines coupled to the local computerized apparatus, enabling communication of forming tool status and refurbishing information from the computerized management server to the one or more refurbishing machines.

12. The system of claim 1 further comprising one or more forming tool storage locations each identified by a unique storage location identification code, at individual ones of the company sites, the one or more storage locations coupled to the local computerized apparatus, enabling transmission of information to the computerized management server regarding forming tools stored at each forming tool storage location.

13. The system of claim 12 wherein the computerized management server, executing the software, stores and maintains location information for each forming tool, as to machine tool, tool holder, or storage location.

14. The system of claim 1 wherein the computerized management server, executing the software, records use history for each forming tool, including refurbishing instances by date, time of use since new or refurbishing, use in individual ones of tool holders in individual ones of machine tools, and number of workpieces machined.

15. The system of claim 1 wherein the computerized management server processes information regarding groups of forming tools of a common type, and determines expected life on average over the groups of tools.

16. The system of claim 1 wherein the computerized management server, executing the software, records detailed history for each forming tool, and makes that history available to the subscribers.

17. The system of claim 1 wherein the subscribers include manufacturers of the forming tools, and information regarding use of the forming tools is made available to the manufacturers of the forming tools.

18. The system of claim 1 wherein the database application stores executable software routines associated with individual ones of the machine tools and individual ones of the shaping tools used in the individual ones of the machine tools, and transmits said software routines to the machine tools for execution.

19. The system of claim 18 wherein the software routines comprise cutting data recommendations, adjustment programs for the machine tools or collision consideration models.

20. The system of claim 1 wherein subscribers are required to indicate authorization to access data in the database.

21. The system of claim 1 further comprising a web site providing one or more interactive interfaces to a subscriber using a browser application, enabling the subscriber to locate and access information in the database.

22. The system of claim 1 wherein forming tool identification codes are non-contact readable by the sensors associated with the machine tools.

* * * * *